June 4, 1963 H. B. SMITHSON 3,091,780
MACHINE FOR UNCAPPING HONEYCOMBS IN SUPERS
Filed April 9, 1959 2 Sheets-Sheet 1
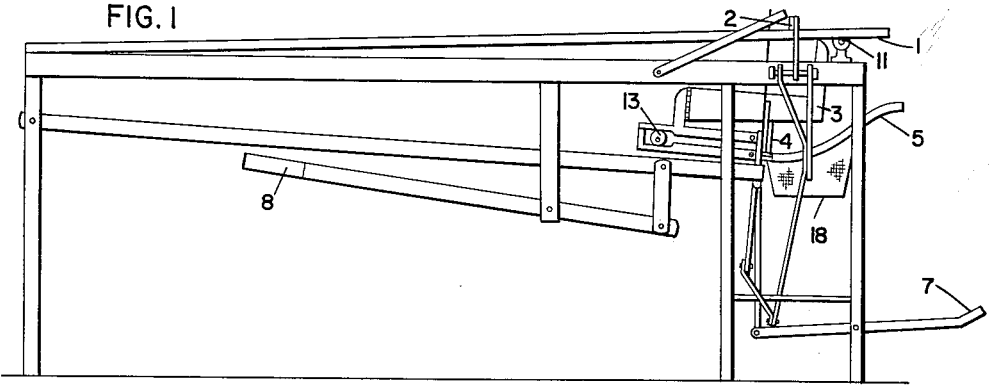
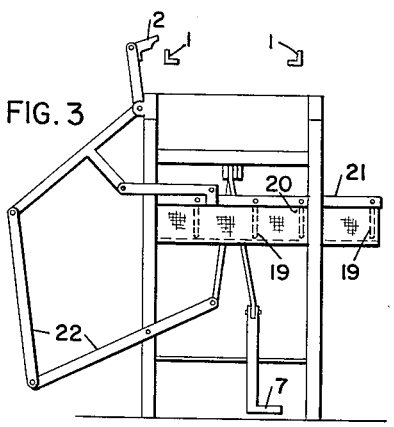
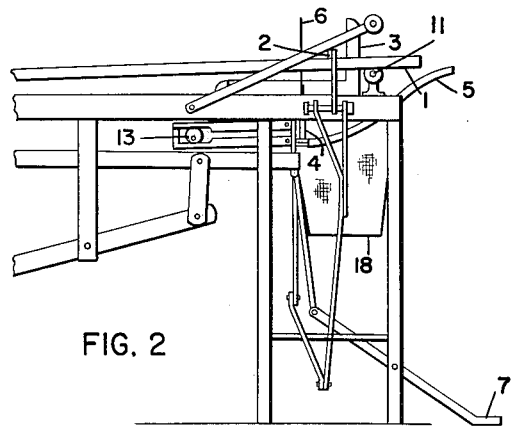
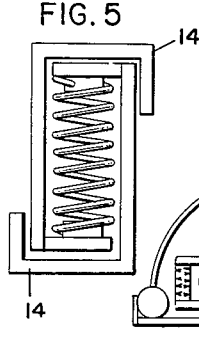
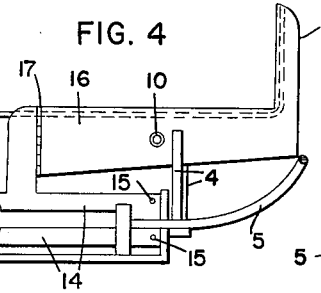
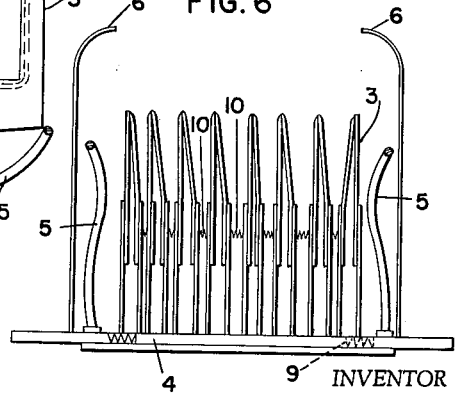
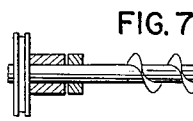
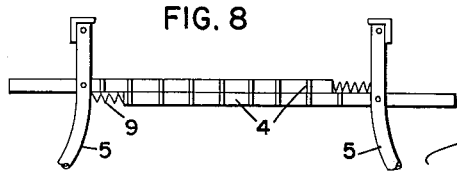
INVENTOR
HARRY B. SMITHSON
BY Stuart M. Mould
ATTORNEY June 4, 1963　　　H. B. SMITHSON　　　3,091,780
MACHINE FOR UNCAPPING HONEYCOMBS IN SUPERS
Filed April 9, 1959　　　2 Sheets-Sheet 2

INVENTOR
HARRY B. SMITHSON
BY *Stuart M. Maule*
ATTORNEY

United States Patent Office 3,091,780
Patented June 4, 1963

3,091,780
MACHINE FOR UNCAPPING HONEYCOMBS
IN SUPERS
Harry B. Smithson, Mancos, Colo.
Filed Apr. 9, 1959, Ser. No. 805,228
6 Claims. (Cl. 6—12)

This invention consists of machinery which will complete the whole process of removing the cappings from the combs, scraping the tops of the top-bars and the bottoms of the bottom-bars, and of centrifuging the honey from the cells, in a reversible extractor, without ever removing the frames from the surplus receptacles, or supers.

In taking honey from the combs by the process known as extracting it has previously been customary to remove the frames from the supers and uncap each frame individually, usually by a hand operated knife. In an attempt to increase speed some operators are using machines in which the individual frames move between rapidly revolving cutters. It is generally acknowledged that this last procedure causes an undesirably large amount of finely divided cappings to be incorporated in the honey. By my method the cappings are left in much the same condition as after having been removed by a hand knife and also individual handling of frames is avoided. After removing the cappings some operators have replaced the frames in the supers and extracted the honey by placing the supers in a large centrifuge with the supers in such a position that the combs laid with their mid-rib along the radial lines from the center of the centrifuge, or extractor, tops of combs to the outside. In this method no provision is made to present alternate sides of the combs to the effect of the centrifugal force (reversing), but the honey is extracted from both sides of the combs simultaneously (radial extracting). My machinery makes provision for presenting the sides of the combs alternately, tho still in place in the supers, from which they have never been removed.

The machinery illustrated in the accompanying drawings is similar to that which I have constructed and tested. It will be noticed that it shows equipment suitable to uncap frames spaced seven to a ten-frame shallow super and an extractor to accommodate seven of these supers. Machinery of this type can be constructed for other sizes of supers and other spacing of frames, or to accommodate a different number of supers in the extractor, and my claims are made with this understanding.

Figure 9:
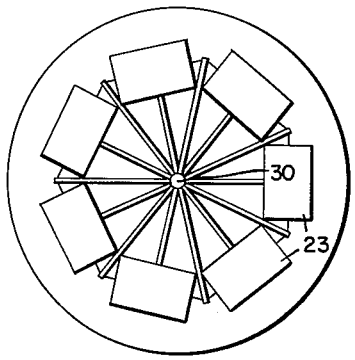
Figure 10:
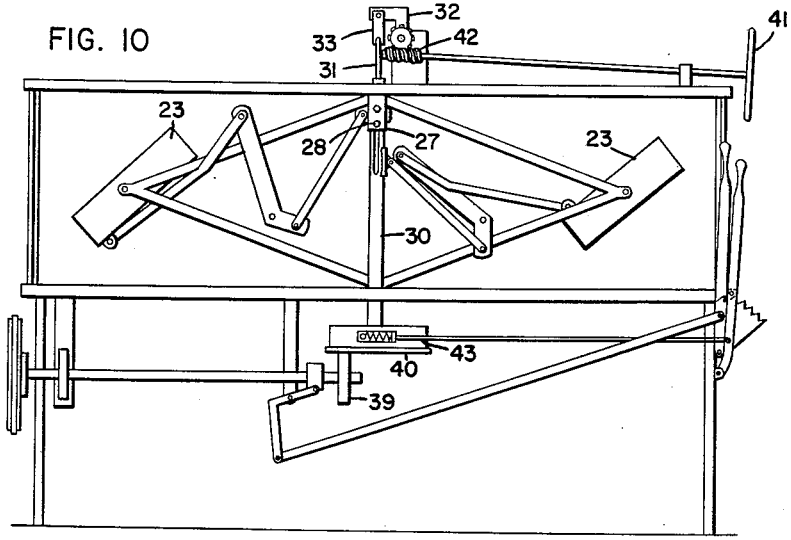
Figure 11:
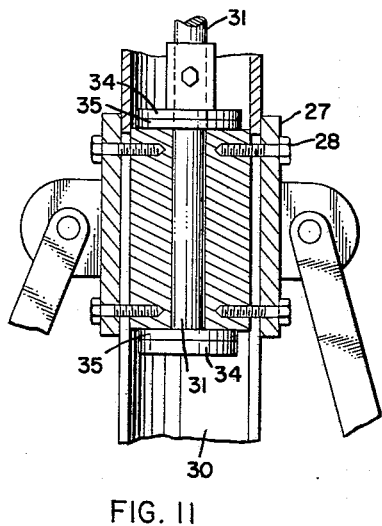
Figure 12:
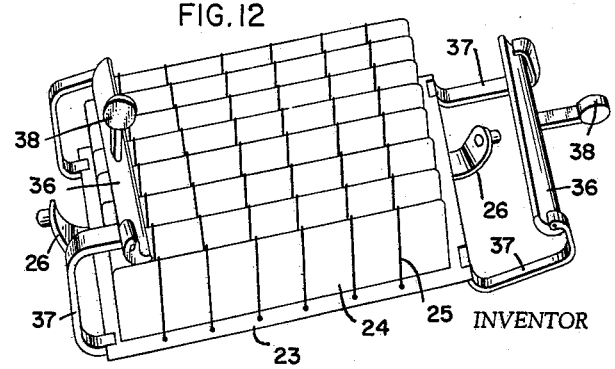

FIGURE 1 is a side view of the uncapper with the knives lowered ready for their entry into the super. FIGURE 2 is a side view of the same with the knives raised and in position in the super. FIGURE 3 is an end view of the same, showing to better advantage the mechanism connected with the super stop and with the fingers that laterally shift the removed cappings. In this view uncapping head, in which knives are mounted, has been omitted for sake of clarity. FIGURE 4 is a larger scale illustration of the knives and the parts which operate them. FIGURE 5 is an even larger scale view of one of the reverse action compression springs and its housing. These arrangements serve to hold the arms against the eccentrics. There is one of these springs and housings for each eccentric and one eccentric for each pair of knives. The eccentrics are all mounted on one shaft but staggered to smooth out operation. Each pair of knives takes care of each interstice between combs, or between outside comb and the side of the super. FIGURE 6 is an enlarged front view of the uncapping mechanism. FIGURE 7 is an enlarged detail view illustrating the de-burring rolls which remove wax burrs from the tops and bottoms of the frames. FIGURE 8 is an enlarged plan view of the grouping mechanism by which the the knives are spaced, positioned, and the points of each pair brought together to facilitate their entry into the super. FIGURE 9 is a plan view of the centrifuge in which the supers are placed after uncapping. FIGURE 10 is a side, or profile, view of the same on a larger scale. This shows the levers and rods by which the baskets are tilted, thus extracting sides of the combs alternately. The left side of this view shows baskets in one position to extract one side of the combs and the right side shows baskets in the alternate position to extract the other side. FIGURE 11 is a view, on a still larger scale, of the apparatus by which the vertical motion from the conventional type worm and sector gears mounted on top of the extractor is transmitted thru the hollow main spindle of the extractor to the various rods and levers which cause the baskets to simultaneously tilt. This tilting can be done while the reel is in motion. FIGURE 12 shows one of the baskets with the necessary clamps for holding the super in place. The left hand clamp is shown in position to hold the super and the right hand clamp is shown as when open to receive the super. This figure also shows the vanes between the combs which catch the honey during centrifuging and cause it to be deflected to the side of the extractor tank instead of impinging on the adjacent comb.

The way the machinery is operated is this: A super is placed on runways 1 and pushed forward against hinged stop 2. At this point it is in proper position for entry of the heated knives 3, which entry is facilitated thru the spacing and closing together of the various pairs of knives by the grouping mechanism 4, actuated by the handles 5, and the shifting laterally by this mechanism, if necessary, of all the knives so as to place them directly under the interstices between the combs, as shown by the indicators 6. Having the knives grouped and placed in proper position, as above, they are raised into the super by pressing down on foot treadle 7. This operation requires little effort, due to counterweight 8. The handles 5, spring loaded at 9, are then released, permitting the knives 3, actuated by compression springs 10 between the members of each pair, to assume their proper uncapping position against the wood of the frame. The super is then pushed forward manually until the knives are at the other end of the combs at which time the foot treadle 7 is released and knives are thereby lowered from the super. While this uncapping process is going on the rolls 11, hollow and steam heated, with spiral vanes 12, push the burrs of wax which are commonly present on the top-bars and bottom-bars of the frames, to the interstices between the combs, at which place they are within the scope of the knives and are incorporated in the cappings. The knives are vibrated by eccentrics 13, which actuate bars 14, hinged horizontally at 15. Arms 16, on which the knives are mounted solidly, are hinged vertically to the bars at 17. Cappings removed by the knives fall on draining screen 18 and are stirred and moved slowly off the screen by hinged fingers 19 which have a positive stop 20 to produce movement of the cappings on the out trip but hinged to permit riding over the unmoved cappings on the return. These fingers are attached to frame 21 and frame is moved by linkage 22 by the same operation which depresses foot treadle 7. Having the supers uncapped as above they are placed in the extractor, thru side loading door, into baskets 23, lowering supers into place so that vanes 24 come in the interstices between the combs. Combs are held from direct contact with the vanes by wires 25. The supers are put into place while all the baskets are in the position shown in the left side of FIGURE 10. Baskets are hinged to extractor reel by hinge pins thru holes in ears 26 and must be in only one position at any one time as there is only one control mechanism as shown in FIGURE 11. This mechanism consists of an outer shell 27, fastened solidly by studs 28 to inner box 29. Necessary movement of the whole mechanism is permitted by slots in hollow extractor spindle 30. These vertical slots permit the vertical travel of studs 28 and the whole mechanism. Shaft 31 is free to rotate in the inner box 29 and is connected to steering arm 32 by linkage 33. The caps 34 and thrust bearings 35 on shaft 31 permit rotary motion and make positive the up and down movement necessary. Supers are clamped in baskets by eccentrically hinged bars 36, swung on clamp hinges 37. Clamp handles 38 are fastened solidly to bars 36. Extractor reel having been put in motion by engaging friction pulley 39 and disc 40, supers are reversed at suitable intervals by hand wheel 41 attached to worm and sector gears 42. Stopping the motion of the extractor reel is readily effected by disengaging the friction drive and operating conventional type brake drum and band 43.

The machinery at present in operation has the eccentrics for the knife motion, the de-burring rolls, and the extractor reel powered by three separate electric motors but the method of powering these forms no part of the present invention.

I claim:

1. In honey extracting apparatus, a machine for uncapping honeycomb still in place within a plurality of frames mounted in spaced parallel relation within a hive super, comprising a runway adapted to slidably support the hive super, a knife carrier mounted for up and down movement below said runway, a plurality of pairs of knives projecting upward from said carrier and mounted thereon for longitudinal reciprocatory movement, means for raising said knife carrier to thrust said knives into the spaces between said frames with one pair of knives in each space, and means operable as the hive super is slid along said runway for reciprocating the knives.

2. In honey extracting apparatus, a machine for uncapping honeycomb still in place within a plurality of frames mounted in spaced parallel relation within a hive super, comprising a runway adapted to slidably support the hive super, a knife carrier mounted for up and down movement below said runway, a plurality of pairs of knives projecting upward from said carrier and mounted thereon for longitudinal reciprocatory movement and for limited lateral movement, means for moving said knives laterally to place the knives of each pair near each other or spread apart, means operable while the respective knives of each pair are disposed near each other for raising said knife carrier to thrust the knives into the spaces between said frames, and means operable as the hive super is slid along said runway for reciprocating the knives.

3. In honey extracting apparatus, a machine for uncapping honeycomb still in place within a plurality of frames mounted in spaced parallel relation within a hive super, comprising a runway adapted to slidably support the hive super, a knife carrier mounted for up and down movement below said runway, a plurality of pairs of knives projecting upward from said carrier and mounted thereon for longitudinal reciprocatory movement and for limited lateral movement, means for moving said knives laterally to place the knives of each pair near each other or spread apart, means operable while the respective knives of each pair are disposed near each other for raising said knife carrier to thrust the knives into the spaces between said frames, means operable as the hive super is slid along said runway for reciprocating the knives, and resilient means urging said knives to move laterally so as to spread the knives of each pair apart into positions to cut the caps from the respectively adjacent combs.

4. Honeycomb uncapping apparatus comprising a runway for guiding a hive super containing a plurality of spaced parallel frames of capped honeycomb for such movement that the frames move in their respective planes, a knife carrier mounted adjacent the runway, a plurality of elongate knives projecting from the carrier and mounted thereon for reciprocatory movement, said carrier being movable toward and away from the runway to optionally project the knives into the hive super between the frames, or to withdraw the knives therefrom, and means for reciprocating the knives while they are between the frames and while the hive super slides along the runway to sever the caps from said honeycomb.

5. Honeycomb uncapping apparatus comprising a runway for guiding a hive super containing a plurality of spaced parallel frames of capped honeycomb for such movement that the frames move in their respective planes, a knife carrier mounted adjacent the runway, a plurality of elongate knives projecting from the carrier and mounted thereon for reciprocatory movement, said carrier being movable toward and away from the runway to optionally project the knives into the hive super between the frames, or to withdraw the knives therefrom, means for moving alternate knives laterally to arrange the knives in pairs with the knives of each pair close together to facilitate their entry between two adjacent frames, and means for reciprocating the knives while the hive super moves along the runway to sever the caps from said combs.

6. Honeycomb uncapping apparatus comprising a runway for guiding a hive super containing a plurality of spaced parallel frames of capped honeycomb for such movement that the frames move in their respective planes, a knife carrier mounted adjacent the runway, a plurality of elongate knives projecting from the carrier and mounted thereon for reciprocatory movement, said carrier being movable toward and away from the runway to optionally project the knives into the hive super between the frames or to withdraw the knives therefrom, means for moving alternate knives laterally to arrange the knives in pairs with the knives of each pair close together to facilitate their entry between two adjacent frames, means operable after the knives have entered between the frames for spreading the knives of each pair to press the knives against the respective comb, and means for reciprocating the knives while said hive super advances along the runway to effect severance of the caps from said combs.

References Cited in the file of this patent

UNITED STATES PATENTS

| | | |
|---|---|---|
| 890,397 | Avant | June 9, 1908 |
| 900,643 | Avant | Oct. 6, 1908 |
| 994,813 | Baker | June 13, 1911 |
| 1,791,605 | Root | Feb. 10, 1931 |
| 1,825,020 | Snyder | Sept. 29, 1931 |
| 2,580,397 | Bogenschutz | Jan. 1, 1952 |
| 2,631,307 | Sugano | Mar. 17, 1953 |